A. C. WILL.
HANDLE LOCK.
APPLICATION FILED MAY 26, 1914.

1,134,792.

Patented Apr. 6, 1915.

Witnesses
W. R. Smith

Inventor
A. C. Will.

By Victor J. Evans
Attorney

UNITED STATES PATENT OFFICE.

ARTHUR C. WILL, OF SALT LAKE CITY, UTAH.

HANDLE-LOCK.

1,134,792.  Specification of Letters Patent.  Patented Apr. 6, 1915.

Application filed May 26, 1914. Serial No. 841,136.

*To all whom it may concern:*

Be it known that I, ARTHUR C. WILL, a citizen of the United States, residing at Salt Lake City, in the county of Salt Lake and State of Utah, have invented new and useful Improvements in Handle-Locks, of which the following is a specification.

This invention relates to handle locks and more particularly to means for locking the handle supporting means of furniture handles against accidental displacement.

The principal object of the invention is to provide simple and efficient means for preventing the accidental displacement of furniture handles which means may be conveniently and readily applied and operated to permit the removal of the handle when desired.

Further objects of the invention will appear as the following description is read in connection with the accompanying drawing, which forms a part of this application, and in which:—

Figure 2:
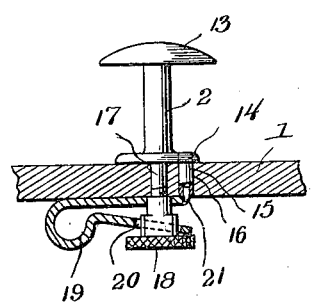
Figure 1:
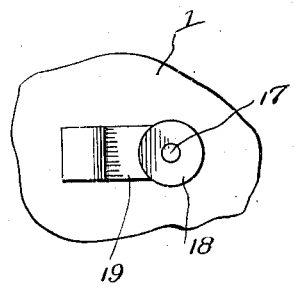
Figure 3:
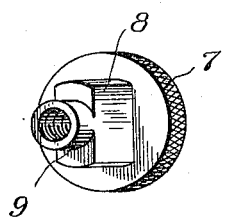

Figure 1 is a top plan view of a knob showing the same secured to a support. Fig. 2 is a sectional view therethrough. Fig. 3 is a perspective view of one of the nut screws.

In the specific embodiment of the invention as illustrated herein, 1 represents a suitable support which may be a bureau, chiffonnier or side-board drawer to which the handle 2 is secured. In the specific arrangement shown this handle is provided with a knob 13 and with a flange 14 which rests against the outer surface of the support and this flange carries a longitudinally extending pin 15 adapted to enter a hole 16 in the support 1 formed adjacent the hole for the reception of the bolt 17 which forms an extension of the knob and has threaded thereon a nut 18 similar to the nuts before described.

A substantially U-shaped spring 19 having an aperture in one leg and a slot 20 in the opposite leg is placed over the bolt and has a laterally extending tip or projection 21 which enters the hole 16 and prevents the clip from turning. When the legs of the clip are forced together the nut may turn in any direction but when allowed to expand the outer leg engages the sides of the nut and prevents the same from turning.

It will be noticed that by using a single aperture 16 the lateral teats or projections 15 and 21 are engaged with the same so as to prevent the knob and the nut locking member from turning.

What is claimed is:—

The combination with a support having apertures therein, a bolt extending through one of the apertures and carrying a knob, a pin carried by the knob and engaged with the other of said apertures, a nut threaded upon the bolt and having a rectangular body, a U-shaped spring nut locking member engaged over the bolt and having a slot in one of the legs to engage the nut, and a lateral extension on the locking member entering the other of said apertures.

In testimony whereof I affix my signature in presence of two witnesses.

ARTHUR C. WILL.

Witnesses:
 MARY H. HUNTER,
 GEO. B. SMITH.

Copies of this patent may be obtained for five cents each, by addressing the "Commissioner of Patents, Washington, D. C."